(12) United States Patent
Estes et al.

(10) Patent No.: US 7,234,540 B2
(45) Date of Patent: Jun. 26, 2007

(54) GYROSCOPIC STEERING TOOL USING ONLY A TWO-AXIS RATE GYROSCOPE AND DERIVING THE MISSING THIRD AXIS

(75) Inventors: Robert A. Estes, Tomball, TX (US);
Jonathan R. Bynum, Spring, TX (US);
Randell Riggs, Montgomery, TX (US);
David M. Epplin, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 343 days.

(21) Appl. No.: 10/911,921

(22) Filed: Aug. 5, 2004

(65) Prior Publication Data

US 2005/0056461 A1    Mar. 17, 2005

Related U.S. Application Data

(60) Provisional application No. 60/493,300, filed on Aug. 7, 2003.

(51) Int. Cl.
*E21B 47/024*    (2006.01)
*E21B 7/06*    (2006.01)

(52) U.S. Cl. ............................ 175/45; 175/61; 33/313; 702/9

(58) Field of Classification Search ................. 175/45, 175/61; 33/313, 304; 702/9
See application file for complete search history.

(56) References Cited

U.S. PATENT DOCUMENTS

| | | | |
|---|---|---|---|
| 5,432,699 A | 7/1995 | Hache et al. | ............... 364/422 |
| 6,347,282 B2 | 2/2002 | Estes et al. | ..................... 702/6 |
| 6,453,239 B1* | 9/2002 | Shirasaka et al. | ........... 701/220 |
| 6,529,834 B1 | 3/2003 | Estes et al. | ..................... 702/9 |
| 6,631,563 B2* | 10/2003 | Brosnahan et al. | ........... 33/313 |
| 6,668,465 B2* | 12/2003 | Noureldin et al. | ............ 33/304 |
| 7,080,460 B2* | 7/2006 | Illfelder | ....................... 33/313 |
| 2002/0133958 A1* | 9/2002 | Noureldin et al. | ............ 33/304 |

* cited by examiner

*Primary Examiner*—Hoang Dang
(74) *Attorney, Agent, or Firm*—Madan, Mossman & Sriram, P.C.

(57) ABSTRACT

A two-axis gyroscope used on a bottom hole assembly can be used for determining a rate of rotation about the rotational axis of a BHA. The method takes advantage of possible misalignment of at least one axis of the two axis gyroscope from orthogonality with respect to the rotational axis of the BHA, resulting in the misaligned gyro being sensitive to BHA rotation.

22 Claims, 7 Drawing Sheets

GYROSCOPIC STEERING TOOL USING ONLY A TWO-AXIS RATE GYROSCOPE AND DERIVING THE MISSING THIRD AXIS

CROSS-REFERENCES TO RELATED APPLICATIONS

This applications claims priority from U.S. Provisional Patent Application Ser. No. 60/493,300 filed on Aug. 7, 2003

FIELD OF THE INVENTION

This invention relates generally to bottom hole assemblies for drilling oilfield wellbores and more particularly to the use of gyroscopic and other sensors to determine wellbore and drilling tool direction during the drilling of the wellbores and to the correction of data from such sensors.

BACKGROUND OF THE INVENTION

To obtain hydrocarbons such as oil and gas, wellbores (also referred to as the boreholes) are drilled by rotating a drill bit attached at the end of a drilling assembly generally referred to as the "bottom hole assembly" (BHA) or the "drilling assembly." A large portion of the current drilling activity involves drilling highly deviated and substantially horizontal wellbores to increase the hydrocarbon production and/or to withdraw additional hydrocarbons from the earth's formations. The wellbore path of such wells is carefully planned prior to drilling such wellbores utilizing seismic maps of the earth's subsurface and well data from previously drilled wellbores in the associated oil fields. Due to the very high cost of drilling such wellbores and the need to precisely place such wellbores in the reservoirs, it is essential to frequently determine the position and direction of the drilling assembly and thus the drill bit during drilling of the wellbores. Such information is utilized, among other things, to monitor and adjust the drilling direction of the wellbores. It should be noted that the terms "wellbore" and "borehole" are used interchangeably in the present document.

In the commonly used drilling assemblies, the directional package commonly includes a set of accelerometers and a set of magnetometers, which respectively measure the earth's gravity and magnetic fields. The drilling assembly is held stationary during the taking of the measurements from the accelerometers and the magnetometers. The toolface and the inclination angle are determined from the accelerometer measurements. The azimuth is then determined from the magnetometer measurements in conjunction with the tool face and inclination angle. As used herein, the term "toolface" means the orientation angle of the bent housing or sub in the borehole with respect to a reference such as high side of the borehole which indicates the direction in which the borehole will be curving. The inclination angle is the angle between the borehole axis and the vertical (direction of the gravity field). The azimuth is the angle between the horizontal projection of the borehole axis and a reference direction such as magnetic north or absolute north.

The earth's magnetic field varies from day to day, which causes corresponding changes in the magnetic azimuth. The varying magnetic azimuth compromises the accuracy of the position measurements when magnetometers are used. Additionally, it is not feasible to measure the earth's magnetic field in the presence of ferrous or ferromagnetic materials, such as casing and drill pipe. Gyroscopes measure the rate of the earth's rotation, which does not change with time nor are the gyroscopes adversely affected by the presence of ferrous materials. Thus, in the presence of ferrous materials the gyroscopic measurements can provide more accurate azimuth measurements than the magnetometer measurements.

U.S. Pat. No. 5,432,699 of Hache et al. discloses a method and apparatus measuring motion signals of gyroscopes in downhole instruments used to determine the heading of a borehole. Accelerometer and magnetometer data along three orthogonal axes of a measurement sub are used to obtain unit gravitational and magnetic vectors. The gyroscope measurements are used to correct the magnetic and gravity measurements made by the magnetometer and the accelerometer respectively. The calculations performed in the correction process by this, and other prior art optimization schemes based upon least squares methods, are valid when the measurements are corrupted by random additive noise. As would be known to those versed in the art, in the presence of systematic measurement errors, such least-squares optimization methods are unreliable.

Commercially available gyroscopes contain systematic errors or biases that can severely deteriorate accuracy of a gyroscope's measurements and thus the azimuth. Gyroscopes have been utilized in wireline survey applications but have not found commercial acceptance in the measurement-while-drilling (MWD) tools used in bottomhole assemblies.

In wireline applications, the survey tool is conveyed into the wellbore after the wellbore has been drilled, in contrast to the MWD tools wherein the measurements are made during the drilling of the wellbores. Wireline methods are not practical in determining the drilling assembly position and direction during the drilling of the wellbores. In wireline applications, the gyroscopes are used either in a continuous mode or at discrete survey intervals. Wireline survey methods often make it unnecessary to employ techniques to compensate for the present-value of the gyroscope biases. In wireline applications, the gyroscope can be powered-up at the surface and allowed to stabilize (thermally and dynamically) for a relatively long time period. Typically a warm-up period of ten (10) minutes or more is taken. The power to the gyroscope is continuously applied from the beginning at the surface, through the actual wellbore survey and through the final check of the survey tool at the surface at the end of the survey. Therefore, reference alignments can be made at the surface prior to commencing the wellbore survey to adjust the drift in a gimbaled gyroscope or verify the alignment accuracy of a north-seeking gyroscope. The initial independent reference can then be used at the end of the wireline survey. Any bias in the gyroscope in a wireline tool can be measured at the surface by taking the difference in the alignments at the beginning and the end of the survey runs. Furthermore, the wireline tool carrying the north-seeking gyroscope can easily be rotated at the surface to several different toolface (roll angle) positions to determine the bias present on either of the transverse gyroscopes (i.e., along the x and y axis of the tool) when the tool is at the surface. This bias can be used to verify the accuracy or to correct the gyroscope measurements.

In the MWD environment, the above-noted advantages of the wireline systems are not present. The MWD surveys are usually taken during drill pipe connection times during the drilling of the wellbore, which intervals are relatively short—generally one to four minutes. Power in the MWD tools is generated downhole and/or provided by batteries. To conserve the power, it is desirable to switch off the gyroscopes when not in use because the gyroscopes consume considerable power. For MWD tools utilizing turbine-alternator, the power is generated by flow of the drilling fluid ("mud") which is interrupted at each pipe connection. Even if the power could be applied continuously, the difference in the bias measured at the surface prior to the drilling and post drilling is not considered an accurate measure due to the very long time between drilling assembly trips, which are typically between 20 and 200 hours.

Earlier 2-axis (X-Y) gyro tools could be used for North-Seeking gyrocompass operations when the tool is vertical up to about 60 degrees inclination. This is a static operation, which is done during pipe connections while there is no motion of the drillstring. Gyroscopic steering of oilfield drilling assemblies is typically accomplished by the addition of a 3rd (Z-axis) gyro which is oriented to measure the rotation of the toolface along the long axis of the drillstring. An example of such a device is disclosed in U.S. Pat. No. 6,347,282 and U.S. Pat. No. 6,529,834 to Estes et al, having the same assignee and the contents of which are incorporated herein by reference. With slim (1-¾" OD) tools, there is very little room to accommodate a 3rd gyro axis mounted crosswise to the X and Y axes, which are often realized in a single, 2-axis rate gyroscope.

Prior art devices have added a smaller, less accurate rate gyro in the Z-axis to allow direct measurements of the angular rotation rate in the Z-axis (toolface). By integrating this Z-axis rate, these tools can track changes in the toolface angular orientation as the drilling motor and deviation device (bent sub) are sliding down the borehole. However, the resultant accuracy leaves a lot to be desired.

Attempts by the applicant to track toolface using only the Rate-X and Rate-Y measurements have been made using a modification of the original gyrocompassing technique. On the theory that there may be some time periods when the BHA is still enough to allow using the conventional North-seeking operation to work, a "Fast Intermittent Gyrocompassing" technique was tested. Laboratory tests showed that the extreme difference between earth rate (15 deg/hr) and toolface changes during typical drilling (~45 deg/sec or ~162,000 deg/hr) caused detection problems. There is no guarantee the platform will ever be stable, and no independent indicator of a sufficiently stable condition. Even minuscule drillstring relaxation after a drilling period is likely to introduce large rate errors in trying to measure the earth's rotation.

It is desirable to be able to track toolface changes during steering, using only an (X-Y) 2-axis rate gyro sensor. The present invention satisfies this need.

SUMMARY OF THE INVENTION

The present invention is a method of using a two-axis gyroscope on a housing for determining a rate of said housing about a third axis, when the two axes of the two-axis gyroscope are substantially orthogonal to each other and to the third (the z) axis, but at least one of these two gyroscope axes has a small deviation from orthogonality relative to the third axis. Under these conditions, the misaligned gyro has a sensitivity to rotation about the third axis. This makes it possible to determine the toolface angle of a drilling assembly with only a two-axis gyro. Using calibration procedures, the major temperature-dependent errors within the gyros are removed. Using prior art indexing procedures, residual bias values for each of the two axes are determined and removed. By rotating the assembly at a known rate about the third axis, the cross-sensitivity can be determined, in the laboratory or downhole, and then subsequently used for determining rotation about the z-axis of the drilling assembly.

The gyro may be conveyed downhole on a drilling tubular or on a wireline. When used in conjunction with a drilling tubular, the method of the present invention is particularly useful in directional drilling operations.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals, wherein.

DETAILED DESCRIPTION OF THE INVENTION

Figure 1:
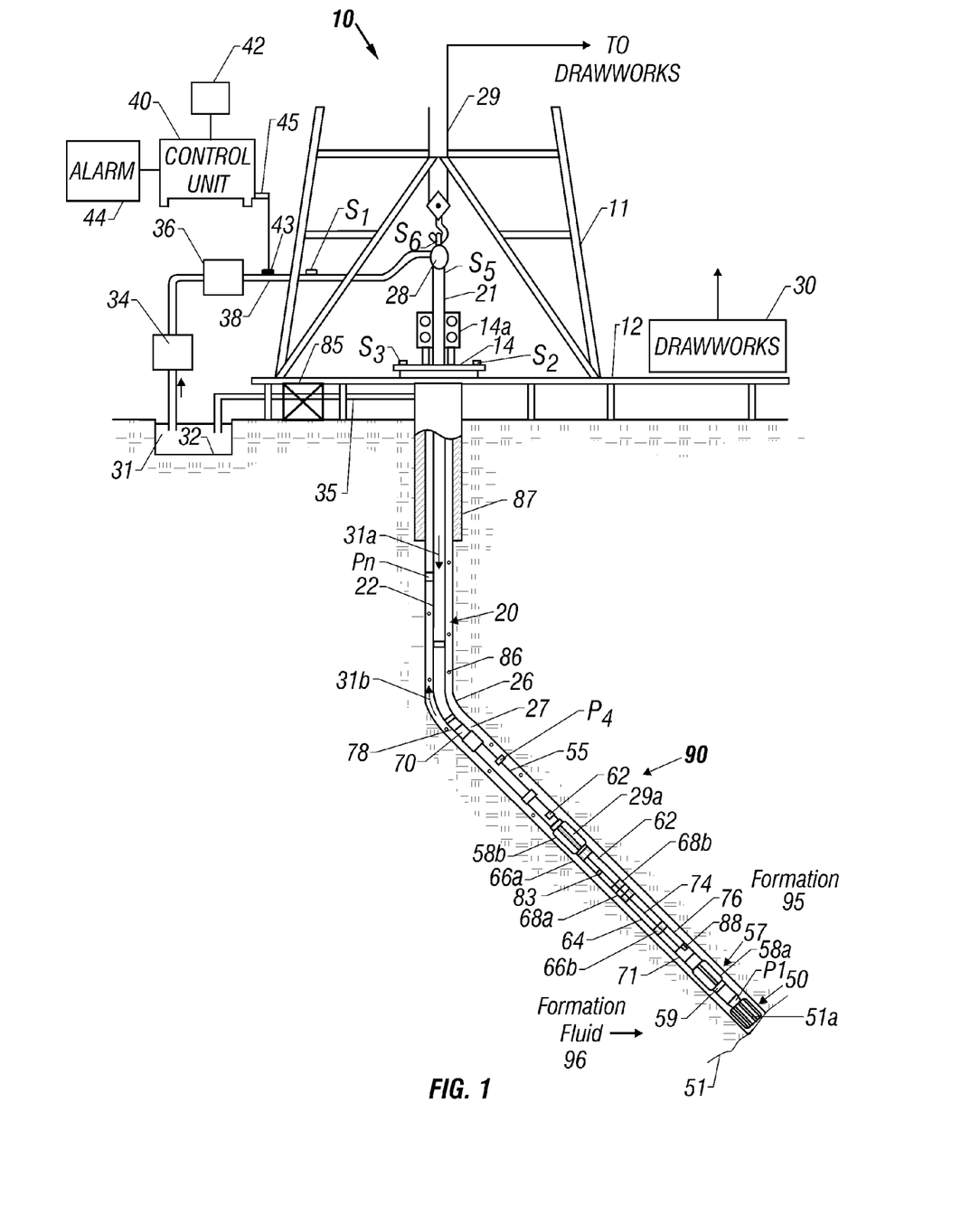
FIG. 1 shows a schematic diagram of a drilling system that employs the apparatus of the current invention in a measurement-while-drilling embodiment.

FIG. 1 (prior art) shows a schematic diagram of a drilling system 10 having a bottom hole assembly (BHA) or drilling assembly 90 that includes gyroscope(s) according to the present invention. The BHA 90 is conveyed in a borehole 26. The drilling system 10 includes a conventional derrick 11 erected on a floor 12 which supports a rotary table 14 that is rotated by a prime mover such as an electric motor (not shown) at a desired rotational speed. The drill string 20 includes a tubing (drill pipe or coiled-tubing) 22 extending downward from the surface into the borehole 26. A drill bit 50, attached to the drill string 20 end, disintegrates the geological formations when it is rotated to drill the borehole 26. The drill string 20 is coupled to a drawworks 30 via a kelly joint 21, swivel 28 and line 29 through a pulley (not shown). Drawworks 30 is operated to control the weight on bit ("WOB"), which is an important parameter that affects the rate of penetration ("ROP"). A tubing injector 14a and a reel (not shown) are used as instead of the rotary table 14 to inject the BHA into the wellbore when a coiled-tubing is used as the conveying member 22. The operations of the drawworks 30 and the tubing injector 14a are known in the art and are thus not described in detail herein.

During drilling, a suitable drilling fluid 31 from a mud pit (source) 32 is circulated under pressure through the drill string 20 by a mud pump 34. The drilling fluid passes from the mud pump 34 into the drill string 20 via a desurger 36 and the fluid line 38. The drilling fluid 31 discharges at the borehole bottom 51 through openings in the drill bit 50. The drilling fluid 31 circulates uphole through the annular space 27 between the drill string 20 and the borehole 26 and returns to the mud pit 32 via a return line 35 and drill cutting screen 85 that removes the drill cuttings 86 from the returning drilling fluid 31b. A sensor $S_1$ in line 38 provides information about the fluid flow rate. A surface torque sensor S2 and a sensor $S_3$ associated with the drill string 20 respectively provide information about the torque and the rotational speed of the drill string 20. Tubing injection speed is determined from the sensor $S_5$, while the sensor $S_6$ provides the hook load of the drill string 20.

In some applications the drill bit 50 is rotated by only rotating the drill pipe 22. However, in many other applications, a downhole motor 55 (mud motor) is disposed in the drilling assembly 90 to rotate the drill bit 50 and the drill pipe 22 is rotated usually to supplement the rotational power, if required, and to effect changes in the drilling direction. In either case, the ROP for a given BHA largely depends on the WOB or the thrust force on the drill bit 50 and its rotational speed.

The mud motor 55 is coupled to the drill bit 50 via a drive disposed in a bearing assembly 57. The mud motor 55 rotates the drill bit 50 when the drilling fluid 31 passes through the mud motor 55 under pressure. The bearing assembly 57 supports the radial and axial forces of the drill bit 50, the downthrust of the mud motor 55 and the reactive upward loading from the applied weight on bit. A lower stabilizer 58a coupled to the bearing assembly 57 acts as a centralizer for the lowermost portion of the drill string 20.

A surface control unit or processor 40 receives signals from the downhole sensors and devices via a sensor 43 placed in the fluid line 38 and signals from sensors $S_1$–$S_6$ and other sensors used in the system 10 and processes such signals according to programmed instructions provided to the surface control unit 40. The surface control unit 40 displays desired drilling parameters and other information on a display/monitor 42 that is utilized by an operator to control the drilling operations. The surface control unit 40 contains a computer, memory for storing data, recorder for recording data and other peripherals. The surface control unit 40 also includes a simulation model and processes data according to programmed instructions. The control unit 40 is preferably adapted to activate alarms 44 when certain unsafe or undesirable operating conditions occur.

The BHA may also contain formation evaluation sensors or devices for determining resistivity, density and porosity of the formations surrounding the BHA. A gamma ray device for measuring the natural gamma ray intensity and other nuclear and non-nuclear devices used as measurement-while-drilling devices are suitably included in the BHA 90. As an example, FIG. 1 shows a resistivity measuring device 64. It provides signals from which resistivity of the formation near or in front of the drill bit 50 is determined. The resistivity device 64 has transmitting antennae 66a and 66b spaced from the receiving antennae 68a and 68b. In operation, the transmitted electromagnetic waves are perturbed as they propagate through the formation surrounding the resistivity device 64. The receiving antennae 68a and 68b detect the perturbed waves. Formation resistivity is derived from the phase and amplitude of the detected signals. The detected signals are processed by a downhole computer 70 to determine the resistivity and dielectric values.

An inclinometer 74 and a gamma ray device 76 are suitably placed along the resistivity measuring device 64 for respectively determining the inclination of the portion of the drill string near the drill bit 50 and the formation gamma ray intensity. Any suitable inclinometer and gamma ray device, however, may be utilized for the purposes of this invention. In addition, position sensors, such as accelerometers, magnetometers or a gyroscopic devices may be disposed in the BHA to determine the drill string azimuth, true coordinates and direction in the wellbore 26. Such devices are known in the art and are not described in detail herein.

In the above-described configuration, the mud motor 55 transfers power to the drill bit 50 via one or more hollow shafts that run through the resistivity measuring device 64. The hollow shaft enables the drilling fluid to pass from the mud motor 55 to the drill bit 50. In an alternate embodiment of the drill string 20, the mud motor 55 may be coupled below resistivity measuring device 64 or at any other suitable place. The above described resistivity device, gamma ray device and the inclinometer are preferably placed in a common housing that may be coupled to the motor. The devices for measuring formation porosity, permeability and density (collectively designated by numeral 78) are preferably placed above the mud motor 55. Such devices are known in the art and are thus not described in any detail.

As noted earlier, a large portion of the current drilling systems, especially for drilling highly deviated and horizontal wellbores, utilize coiled-tubing for conveying the drilling assembly downhole. In such application a thruster 71 is deployed in the drill string 90 to provide the required force on the drill bit. For the purpose of this invention, the term weight on bit is used to denote the force on the bit applied to the drill bit during the drilling operation, whether applied by adjusting the weight of the drill string or by thrusters. Also, when coiled-tubing is utilized the tubing is not rotated by a rotary table, instead it is injected into the wellbore by a suitable injector 14a while the downhole motor 55 rotates the drill bit 50.

A number of sensors are also placed in the various individual devices in the drilling assembly. For example, a variety of sensors are placed in the mud motor power section, bearing assembly, drill shaft, tubing and drill bit to determine the condition of such elements during drilling and to determine the borehole parameters. The preferred manner of deploying certain sensors in drill string 90 will now be described. The actual BHA utilized for a particular application may contain some or all of the above described sensors. For the purpose of this invention any such BHA could contain one or more gyroscopes and a set of accelerometers (collectively represented herein by numeral 88) at a suitable location in the BHA 90. A preferred configuration of such sensors is shown in FIG. 2.

Figure 2:
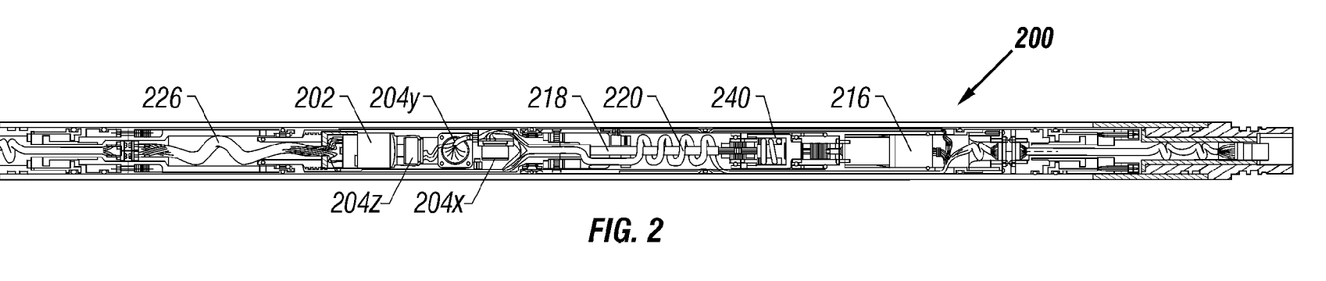
FIG. 2 shows a schematic diagram of a portion of the bottomhole assembly with a set of gyroscopes and a corresponding set of accelerometers according to a preferred embodiment of the present invention.

FIG. 2 is a schematic diagram showing a sensor section 200 containing a gyroscope 202 and a set of three accelerometers 204x, 204y and 204z disposed at a suitable location in the bottomhole assembly (90 in FIG. 1) according to one preferred embodiment of the present invention. The gyroscopes 202 may be a single axis gyroscope or a two-axis gyroscope. In vertical and low inclination wellbores, an x-axis and a y-axis gyroscope are deemed sufficient for determining the azimuth and toolface with respect to the true north. The configuration shown in FIG. 2 utilizes a single two-axis (x-axis and y-axis) gyroscope that provides outputs corresponding to the earth's rate of rotation in the two axis α-axis and y-axis) perpendicular to the borehole axis or the bottomhole assembly longitudinal axis, referred to herein as the z-axis. The sensor 202 thus measures the earth's rotation component in the x-axis and y-axis. The accelerometers

204x, 204y and 204z measure the earth's gravity components respectively along the x, y, and z axes of the bottomhole assembly 90.

The gyroscope 202 and accelerometers 204x–204z are disposed in a rotating chassis 210 that rotates about the radial bearings 212a–212b in a fixed or non-rotating housing 214. An indexing drive motor 216 coupled to the rotating chassis 210 via a shaft 218 can rotate the chassis 210 in the bottomhole assembly 90 about the z-axis, thus rotating the gyroscopes 202 from one mechanical position to another position by any desired rotational angle. A stepper motor is preferred as the indexing drive motor 216 because stepper motors are precision devices and provide positive feedback about the amount of rotation. Any other mechanism, whether electrically-operated, hydraulically-operated or by any other desired manner, may be utilized to rotate the gyroscopes within the bottom hole assembly 90. The gyroscope 202 may be rotated from an initial arbitrary position to a mechanical stop (not shown) in the tool or between two mechanical stops or from an initial peak measurement to a second position as described later. The rotational angle corresponding to a particular axis is selectable.

Although FIG. 2 shows a single two axis gyroscope, a separate gyroscope may be utilized for each axis. A wiring harness 226 provides power to the gyroscope 202 and accelerometers 204x, 204y, 204z. The wiring harness 226 transmits signals from the gyroscope and accelerometers to the processor in the bottomhole assembly 90. Similarly, a suitable wiring harness 220 provides power and signal linkage to the stepper motor 216 and additional downhole equipment. A spring loaded torque limiter 240 may be used to prevent inertial loading caused by drillstring rotation from damaging the gearbox of the stepper motor 216. Alternatively, a preset torque slip clutch may be used.

The present invention is based on the fact that in actual implementation of a two-axis gyroscope (designated herein as the x- and y-axes), the axes are not exactly orthogonal to each other. Recognizing the fact that the x- and y-axes of the rate gyro are not precisely orthogonal to the physical z-axis, then it is clear that there is some responsiveness of the x- and y-rate measurements to a rotation in the z-axis. This may be denoted by the equation:

$$R_x = \frac{S_x}{F_x} - B_x - B_{xg} - M_x R_z \quad (1)$$

where $R_x$ is the x-axis rate, $S_x$ is the output of the x-axis gyro, $F_x$ is a calibration scale factor for the x-axis gyro, $B_x$ is the bias in the x-axis gyro, $B_{xg}$ is a bias term that is gravity related, i.e., it depends on the inclination of the tool, $M_x$ is a misalignment term relating the z-axis rotation rate $R_z$ to the x-axis gyro measured rate. If the x-axis is exactly orthogonal to the z-axis, this misalignment term is zero. This is the assumption that is made in prior art devices. A similar expression may be used for the y-axis rate $R_y$.

$$R_y = \frac{S_y}{F_y} - B_y - B_{yg} - M_y R_z \quad (2)$$

We digress briefly to distinguish the subject matter of the present invention from Algrain, "Determination of 3-D angular rates using two-axis measurements," SPIE Vol. 2468, pp 252–260. While the title is superficially similar to the subject of the present invention, Algrain addresses the problem of using perfectly aligned 2-axis gyros on an object in space (free of the gravity field of the earth) to determine a rotation rate about the third axis. The formulation of the problem is completely different from the present situation wherein imperfectly aligned 2-axis gyro measurements made in the earth's gravity field are used to estimate a rotation rate about the third axis.

The calibration scale factors $F_x$ and $F_y$ are determined using prior art methods—these calibration factors simply relate the output of the x- and y-gyros (which are typically in millivolts) to the x- and y-axis rotation rates. A simple way to determine the misalignment terms in a laboratory setting is first described next with reference to FIG. 3.

Figure 3:
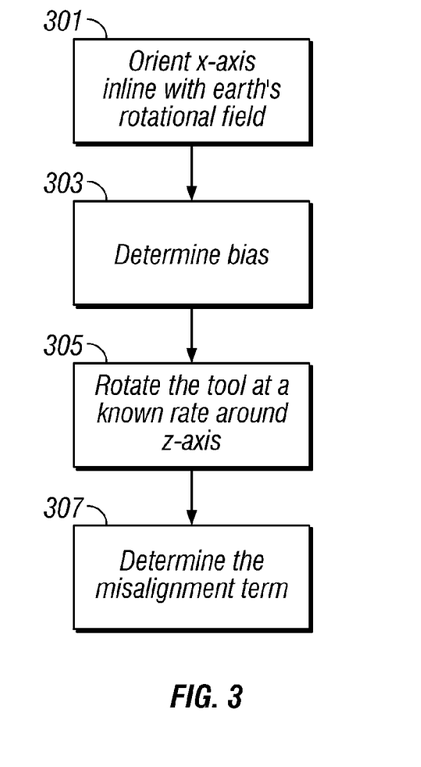
FIG. 3 is a flow chart illustrating a method for determining a deviation from orthogonality between a gyro axis and an axis of rotation intended to be orthogonal to the gyro axis.

Initially, the tool is oriented with its (z) axis inclined vertically so that the gravity terms $B_{xg}$, $B_{yg}$ are zero. This is not a limitation, as a calibration could be carried out with other orientations of the tool as well but would require the use of accelerometer measurements to zero out these terms and complete the calibration. Hence to simplify the discussion, it is assumed that the gravity terms are zero. The scale factors $F_x$ and $F_y$ are known quantities. Using prior art methods such as that described in either of the Estes patents, bias values are estimated for the x- and y-gyros 103. At least two methods are described in the Estes patents. In one of them, gyro readings are taken with one toolface orientation of the tool, the housing is rotated by 180°, and a second gyro reading is taken. In the absence of a bias, readings spaced 180° apart should sum to zero. Any difference from zero of this sum is a measure of the bias in the gyro measurement. In a second method described in the Estes patents, the sensor housing is rotated (preferably using a stepper motor) and by fitting a sinusoid to the readings, bias can be determined.

In a laboratory setting, the misalignment term can be estimated by now rotating the housing at a known rate 105. If the bias corrected x- and y-gyros give a value different from the expected values due to the presence of earth rate, then the misalignment terms are directly obtained as the ratio of the bias corrected measurements and the known rate of rotation about the z-axis 107.

Once the misalignment term has been determined, the outputs of the x- and y-gyros can be used to determine a z-axis rotation rate when there is such actual rotation. This is because the bias terms are now known for the x- and y-gyros, and the gravity term is known from accelerometer and gyro measurements.

The same principle can be used in actual wellbore applications. Some important steps for this are discussed below. However, before discussing how such a method may be implemented in surveying and steering operations, a few comments about the z-axis rotation are in order.

The earth's rotation rate is approximately 15.1 deg/hr (approximately 264 milliradians per hour). The changes in borehole inclination and in borehole azimuth are typically of the same or lesser order of magnitude. In contrast, for a drillstring rotation speed of even 60 rpm, the change in tool face angle is 1,296,000 deg/hr, which is five orders of magnitude greater than the earth's rotation rate. Hence even if a z-axis gyro were mounted on the surveying tool, it would be difficult for such a z-axis gyro to maintain accuracy over such a large dynamic range. A typical misalignment for gyros is of the order of 10 milliradians. The effect of such a misalignment gives a resultant signal on the x- and y-gyros that is comparable in magnitude to measurements normally made by gyros on an MWD tool. Hence the present invention actually takes advantage of the misalignment to give reasonably accurate measurements of toolface angle.

Figure 4:
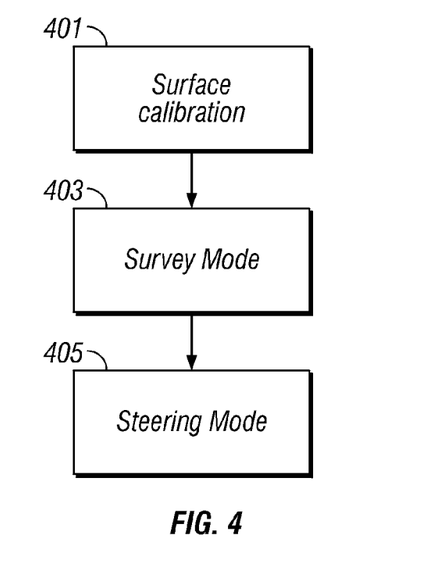
FIG. 4 illustrates the method of the present invention for use in controlling drilling operations.

Turning now to FIG. 4, the three major modes of operation are identified. The first is the surface calibration 401 wherein misalignment of the gyros is determined using methods discussed above with reference to FIG. 3. This step is not essential, but as described below, is helpful in what follows later in the wellbore. In the "survey mode" 403, measurements are carried out at a substantially fixed position of the gyro assembly. The survey mode is followed by a "steering mode" 405 wherein the drillbit is actually making hole with the drillbit turning and powered by a mud motor. The survey mode is commonly used when additional sections of drillpipe are being added.

Figure 5A:
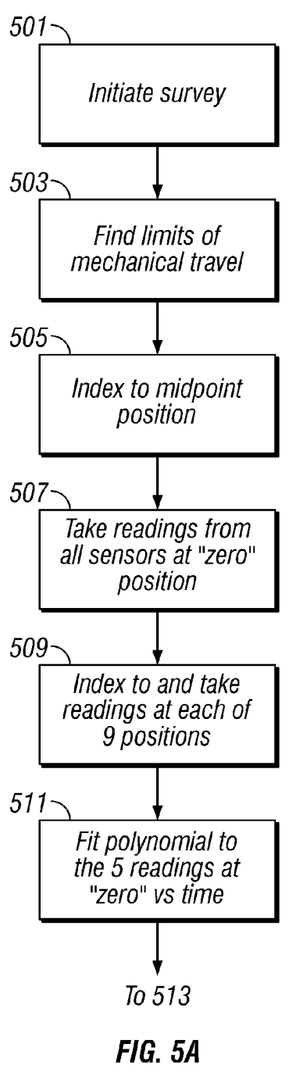
FIGS. 5a–5c illustrate the survey mode of FIG. 4.

Turning now to FIG. 5a, some of the steps that could be carried out in the survey mode are discussed. It is to be noted that while these are described with reference to a flow chart, some of the "steps" identified need not necessarily be carried out in the sequence described. The only implication of a "sequence" of steps is if a particular operation requires the output of another operation. In all other cases, some of the operations could be carried out in parallel or even in a different order than that shown here. The "flow chart" is shown mainly as a matter of convenience to identify the different operations that could be carried out. A general guide to the operations is also given in a listing in the Appendix below. A static survey is initiated after a programmed delay 501. The limits of mechanical travel of the housing carrying the sensors are determined 503 and a midpoint may be defined as the "zero" point 505. Measurements are made with all the sensors on the survey assembly (x- and y-gyros, x-, y- and z-accelerometers and magnetometers if provided) at the "zero" position 507 The indexing process is carried out as described in the Estes patents. In the indexing, measurements are made at the "zero" reading, and at ±20°, ±40° and ±60°, with a measurement taken at the "zero" mark each time 507. It is not essential that these exact values be used, or even that such a number of measurements be made. Next, a polynomial fit is carried out to the measurements made by each of the plurality of sensors at the "zero" mark 511 In an alternate embodiment of the invention, nine readings are taken 40° apart without repeating the zero angle measurement.

The purpose of the polynomial fit is to determine any time dependent drift in the measurements made by the plurality of sensors. The cause of the drift may be temperature variation, though the cause of the drift is not important. This particular step merely identifies the drift if it exists. The order of the polynomial is less than or equal to the number of points to which the polynomial is being fit. In an alternate embodiment of the invention, the sinusoidal fit and the drift compensation may be made simultaneously. A method of determining the correcting for the drift is discussed below with reference to FIGS. 8–11.

Having determined this drift as a function of time, it is then removed from all the measurements made. This is indicated by 513 in FIG. 5b. Next, all the readings are corrected using laboratory determined model parameters 515. This is discussed below with reference to FIG. 6.

Figure 5B:
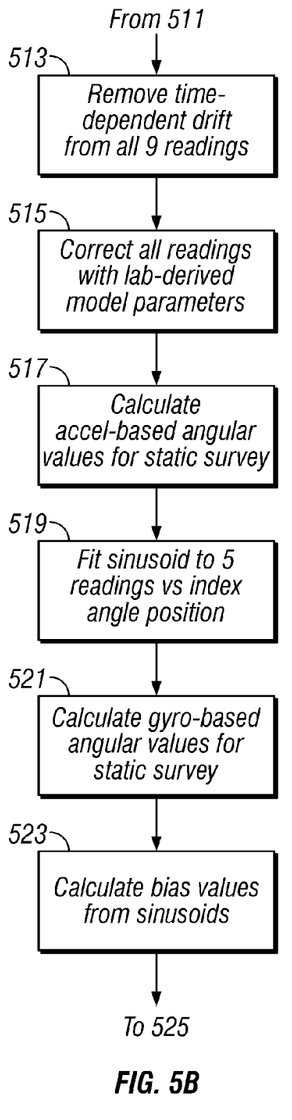
Figure 5C:
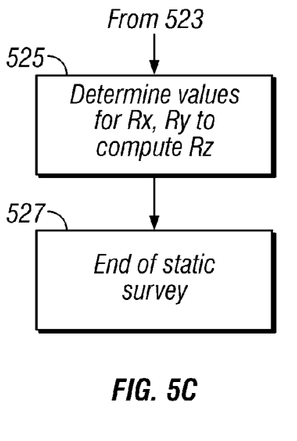

Still referring to FIG. 5b, accelerometer based angular values are obtained for the static survey 517. This includes a determination of high side tool face angle (HSTF), the inclination, and total gravity field (TGF). Next, a sinusoid is fit to the measurements 519 using the corrected HSTF. The variables for the fit are the bias, Scale Factor, and phase. Gyro based angular values for the static survey are determined at 521. Bias values are calculated from sinusoidal fitting of the gyro measurements 523). This is done separately for the x- and y-gyros. Next, the x- and y-rates are calculated at 527 in FIG. 5c . This is the end of the static survey 529.

Figure 6:
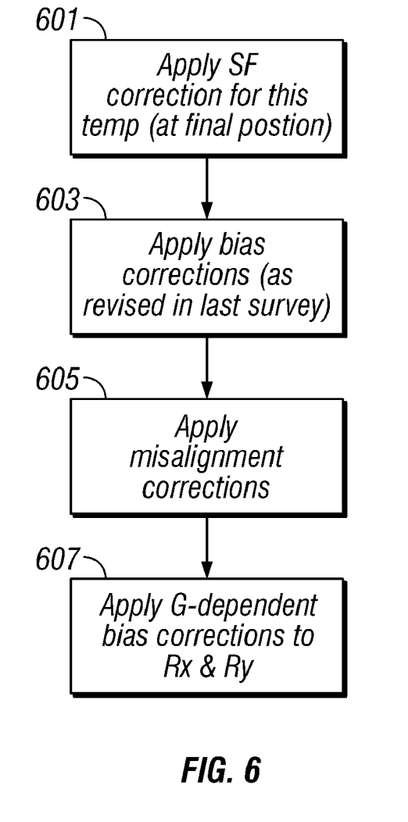
FIG. 6 illustrates a method of correcting downhole measurements using laboratory derived calibrations.

Turning now to FIG. 6, there is a further discussion of details of 515 in FIG. 5b. The operations involved include an application of a scale factor correction for the temperature at the final position 601. A bias correction as obtained from the last survey is applied 603. Misalignment corrections are applied 605 and gravity dependent bias corrections are applied to $R_x$ and $R_y$.

Some details of the "steering" mode are next discussed with reference to FIG. 7. Sample readings are taken at a high rate, typically about 15 Hz 701. A moving average for the accelerometer raw readings is kept, typically over a one second time interval 703. A new value of the $R_z$ is determined for each sample 705. These are done separately from the x- and y-gyros and the two values are averaged.

Figure 7:
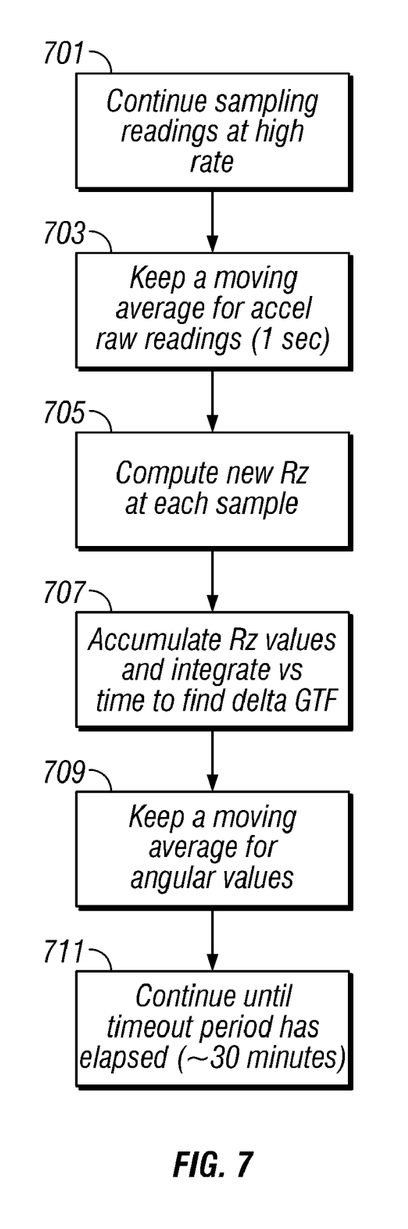
FIG. 7 illustrates the steering mode of FIG. 4.

Still referring to FIG. 7, the $R_z$ values are integrated with respect to time to find the change in the gyro toolface angle GTF 707. The values derived for Rx, Ry, and Rz by any method when the tool is at rest should read components of the earth's rotational field which always combine to produce the amplitude of the earth's known constant rotation rate of 15.04 degrees per hour. As a quality check, and to optimize results, the solutions can be iterated for the calibration terms and the multiple positions such that an optimal fit results in the minimum deviation from the ideal earth field values. This combined looping and iteration through the multiple positions and adjusting the calibration parameters to produce the optimum residual error in the earth field (gravity, magnetic, and/or rotational) follows the techniques disclosed in the SPE paper #19546, by Estes & Walters, in 1989, and is commonly called "Total Field Calibration." This change in the gyro toolface angle (from the running integral) is added to original starting toolface 707 to give the current gyro toolface angle. A moving average for angular values is kept (typically over a 10 second interval) 709. This is the "Steering Gyro TF" value that may be telemetered uphole for enabling steering decisions to be made. This is continued until timeout period has elapsed (~30 minutes) 711, defining the end of the steering mode.

Figure 8:
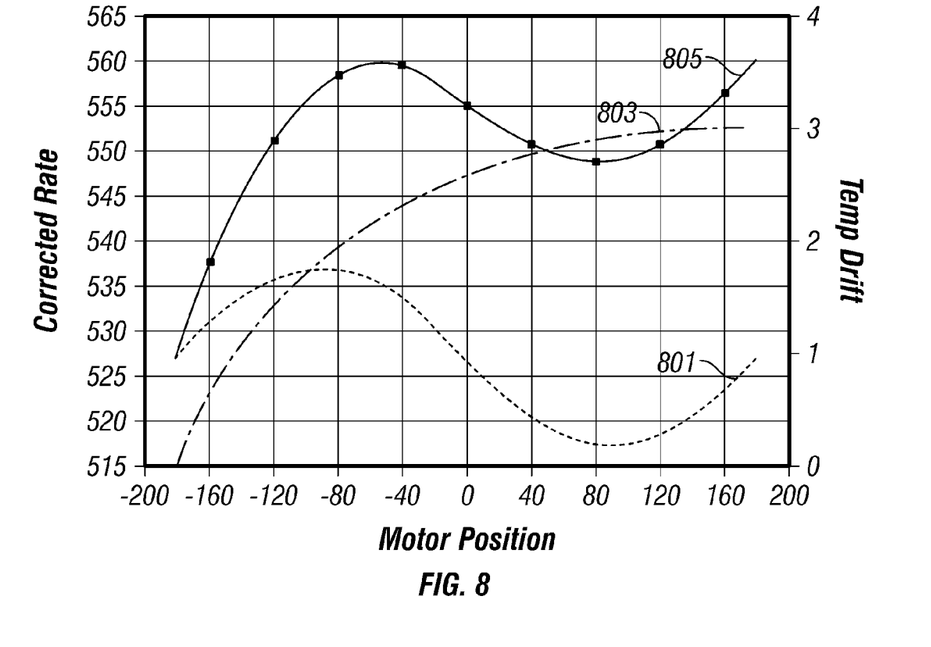
FIG. 8 illustrates the effect of temperature drift on gyroscope measurements.

Turning now to FIG. 8, a method of correcting for temperature drift is discussed. Although all significant error terms are corrected by application of a lab-derived thermal model prior to the fitting of a sinusoid for computation of angular values, this model correction process is not complete. There are still residual errors that distort the ideal sinusoidal shape of the rate measurements vs the indexed positions. This is largely due to the practice of acquiring lab calibration data after thermal stabilization has occurred, while downhole operation at a survey station often occurs during thermally unstable conditions. It is desirable to save battery power, thus the survey station operation is often initiated after a period during which the gyro is turned off, and is now increasing in temperature. Usually, during rapid temperature rise, the gyro exhibits errors which are a function of temperature, although the temperature sensor has not yet reached the corresponding amplitude.

This method assumes that the measured gyro output signal, after applying the temperature correction factors, is a composite of a sine wave from the actual earth rate felt on the sensitive axis during indexing and a residual bias shift that responds linearly with temperature. The response is assumed to be near linear due to the small magnitude of temperature change over the indexing time period. These residual temperature-dependent errors are assumed to be primarily bias errors, since the majority of the other temperature-dependent errors have been compensated already by the thermal model coefficients. The gyroscope is known to have very large bias errors, which dominate the other errors. It is reasonable to assume that the errors left over are bias errors, and over a short temperature excursion that they are a linear function of temperature. A source of error is the fact that the gyro has a much smaller time constant than the temperature sensor, so that the gyro is responding to a temperature that is different from that indicated by the temperature sensor. Unlike all other temperature correction factors, scale factor and mass balances terms, for example, this temperature dependent bias is problematic to determine in laboratory calibrations over such a small temperature span and also reasonably straightforward to correct during the survey station computation.

FIG. 8 shows the 'true rate' signal 801 that represents the ideal sinusoid which will always be the characteristic of the resulting rate applied to the gyro when the sensor housing is indexed. This is true in all cases when the gyro sensitive axis is not null to the earth rate. Additionally, it shows the 'temp drift', the temperature change 803 over the time required to position the housing. Due to the linear relationship of temperature change and bias shift, the characteristics of the 'temp drift' waveform are shared by the bias shift as well. Finally, 'total rate' (measured rate) is the composite 805 of the true sine gyro signal and the gyro bias shift as a result of temperature change.

Figure 9:
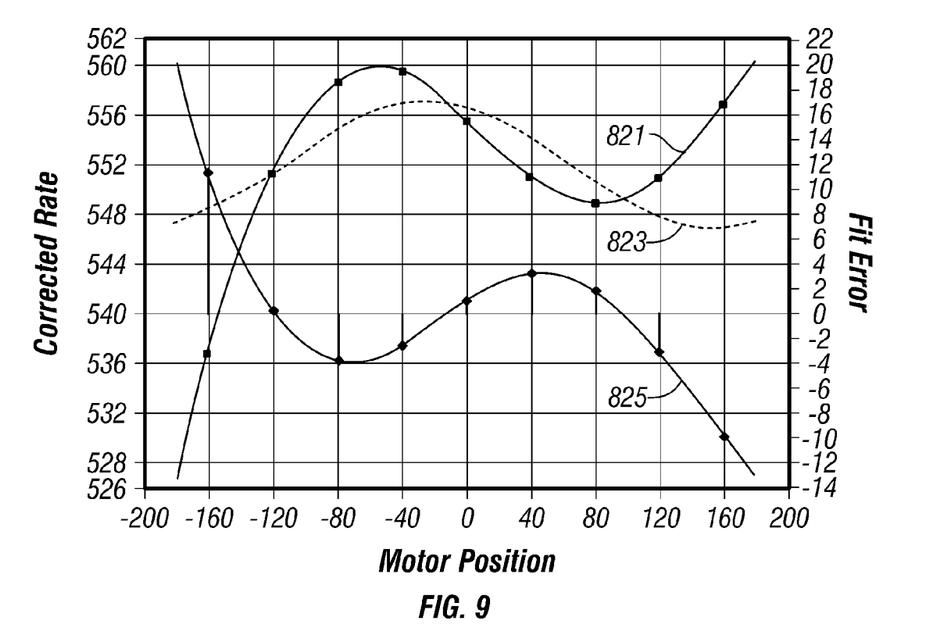
FIG. 9 shows the results of a sinusoidal curve fitting to measurements affected by temperature drift.
Figure 10:
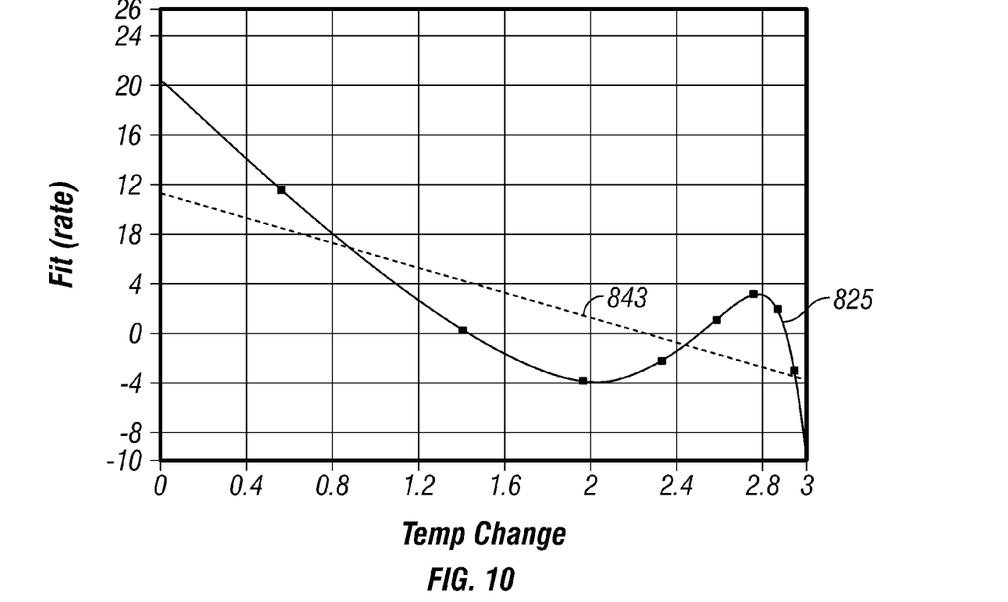
FIG. 10 shows residuals from FIG. 9 as a function of nominal temperature; and, 12
Figure 11:
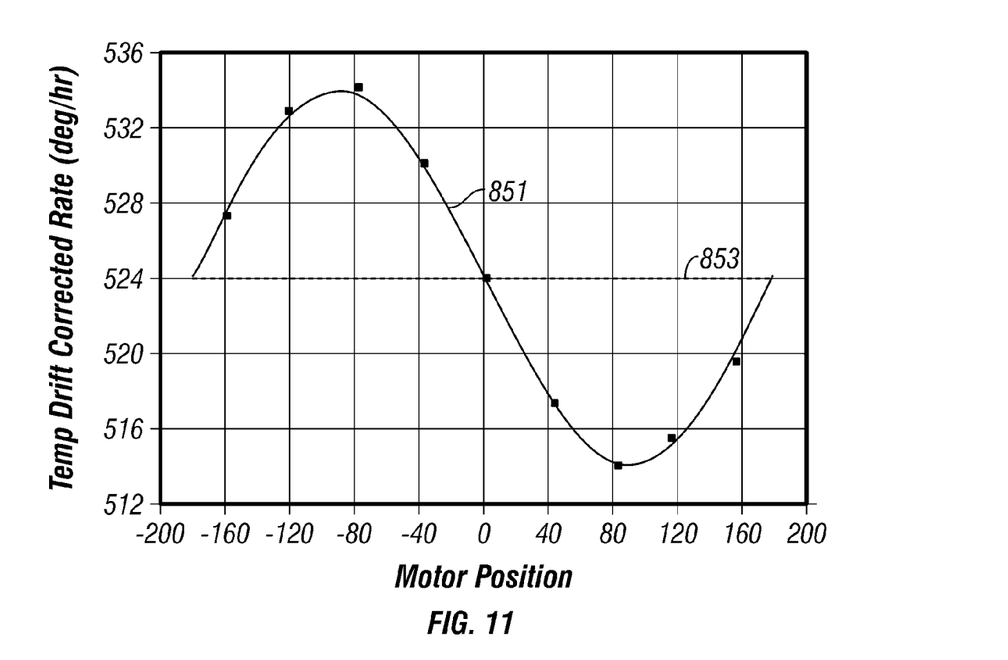
FIG. 11 shows bias determination correcting for the effects of temperature drift.3

After acquiring the signal and applying the laboratory determined temperature correction factors, it is the 'total signal' that is actually measured. The present invention uses an iterative process that will progressively break apart the two components to extract the true sine portion of the signal. FIG. 9 shows the measured 'rate' signal 821 and a sine wave 823 fitted to it using motor position as the x-axis. The fit error 825 is calculated and passed onto the next portion of the method. FIG. 10 shows the same sine fit error 825 now plotted using the nominal temperature change measured by the temperature sensor as the x-axis. This error is now fitted with a linear fit 843, using temperature change as the x-axis. This linear fit of the sine fit error is an approximation of the residual bias shift due to temperature change in the original signal and will be subtracted from the original signal during the next iteration of the method. The process is repeated if necessary, and the final result is shown in FIG. 11 with the corrected gyro readings 851 as a function of angular position and the bias 853.

The bias correction has been described above with reference to gyroscopic measurements. The bias correction method is equally applicable to other types of survey measurements, such as those made by accelerometers, that are also affected by bias and a temperature dependent bias. A downhole processor then controls the drilling direction based on the corrected gyroscope and accelerometer measurements.

Steering a drilling assembly during drilling operations often results in wild angular toolface swings as the bit slips and grabs the stratified rock formations. This results in turn rates on the z-axis with wide dynamic range. In typical operations, a misalignment of less than 1 milliradian results in the x- or y-axis signal being too small for detection of normal rates of rotation about the z-axis. An upper bound on the misalignment is set by the fact that with values greater than 100 milliradians, the x- or y-output signals may exceed the operating range of the A/D converter. A preferred range for use of the method of the invention is between 5 and 20 milliradians.

The invention has been described above with reference to surveying operations and drill-steering applications. The methodology described above may also be used for wireline applications, or for slickline survey instruments. For wireline applications, the survey mode could be entered at any desired time rather than being limited to time periods when drilling is suspended, since drilling operations are not involved. It can also be used in a memory-based "gyro drop shot" configuration While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of drilling a borehole comprising:
    (a) conveying a bottomhole assembly (BHA) on a drilling tubular into said borehole, said BHA including a drillbit for drilling said borehole;
    (b) making measurements with a gyroscope having at least one sensitive axis with an angle of misalignment from orthogonality relative to an axis of rotation of said drilling tubular;
    (c) determining from said measurements a toolface angle of said BHA; and
    (d) drilling said borehole based on said determined toolface angle.

2. The method of claim 1 wherein said angle of misalignment is less than 100 milliradians.

3. The method of claim 1 wherein said angle of misalignment is greater than 1 milliradian.

4. The method of claim 1 wherein determining said toolface angle comprises integrating a determined rate of rotation about said axis of rotation of said drilling tubular.

5. The method of claim 4 wherein determining said rate of rotation comprises using a relation of the form:

$$R_x = \frac{S_x}{F_x} - B_x - B_{xg} - M_x R_z$$

where $R_x$ is a rotation rate about said at least one sensitive axis, $S_x$ is an output of said gyroscope corresponding to said at least one sensitive axis, $F_x$ is a calibration scale factor for said at least one axis, $B_x$ is a bias for the at least one axis, $B_{xg}$ is a bias term for said at least one axis that is gravity related, $M_x$ is a misalignment term.

6. The method of claim 5 further comprising determining said misalignment term from measurements outside said wellbore.

7. The method of claim 1 further comprising correcting said measurements for a bias.

8. The method of claim 7 further comprising determining said bias by making measurements at a plurality of rotational angles of said gyroscope.

9. The method of claim 8 further comprising correcting said measurements at said plurality of rotational angles for a time dependent drift.

10. The method of claim 1 wherein said at least one axis comprises two axes.

11. An apparatus for drilling a wellbore comprising:
    (a) a bottomhole assembly (BHA) conveyed on a drilling tubular into said borehole, said BHA including a drillbit for drilling said borehole;

(b) a gyroscope on said BHA, said gyroscope having at least one sensitive axis with an angle of misalignment from orthogonality with an axis of rotation of said drilling tubular; and (c) a processor which determines from measurements by said gyroscope a toolface angle of said BHA.

12. The apparatus of claim 11 further comprising a processor which controls a direction of drilling of said borehole based on said determined toolface angle.

13. The apparatus of claim 11 wherein said angle of misalignment is less than 100 milliradians.

14. The method of claim 11 wherein said angle of misalignment is greater than 1 milliradian.

15. The method of claim 11 wherein determining said toolface angle comprises integrating a determined rate of rotation about said axis of rotation of said drilling tubular.

16. The apparatus of claim 14 wherein said processor determines said rate of rotation using a relation of the form:

$$R_x = \frac{S_x}{F_x} - B_x - B_{xg} - M_x R_z$$

where $R_x$ is a rotation rate about said at least one sensitive axis, $S_x$ is an output of said gyroscope corresponding to said at least one sensitive axis, $F_x$ is a calibration scale factor for said at least one axis, $B_x$ is a bias for the at least one axis, $B_{xg}$ is a bias term for said at least one axis that is gravity related, $M_x$ is a misalignment term.

17. The apparatus of claim 16 wherein said misalignment term is determined from measurements outside said wellbore.

18. The apparatus of claim 11 wherein said processor corrects said measurements for a bias.

19. The apparatus of claim 18 wherein said processor determines said bias by making measurements at a plurality of rotational angles of said gyroscope.

20. The apparatus of claim 19 wherein said processor further corrects said measurements at said plurality of rotational angles for a drift that is at least one of (i) time-dependent, and, (ii) temperature-dependent.

21. The apparatus of claim 11 wherein said at least one axis comprises two axes.

22. The apparatus of claim 20 further comprising a temperature sensor which provides a plurality of temperature measurements corresponding to said plurality of rotational angles.

* * * * *

UNITED STATES PATENT AND TRADEMARK OFFICE
CERTIFICATE OF CORRECTION

PATENT NO. : 7,234,540 B2
APPLICATION NO. : 10/911921
DATED : June 26, 2007
INVENTOR(S) : Robert A. Estes et al.

It is certified that error appears in the above-identified patent and that said Letters Patent is hereby corrected as shown below:

Column 8, line 24 - please change "103" to read --303--

Column 8, line 35 - please change "105" to read --305--

Column 8, line 40 - please change "107" to read --307--

Please delete FIG. 2 and insert therefor the new FIG. 2 attached.

Signed and Sealed this

Twenty-third Day of October, 2007

JON W. DUDAS
*Director of the United States Patent and Trademark Office*

FIG. 2